United States Patent [19]

Bourdiol et al.

[11] Patent Number: 5,046,936

[45] Date of Patent: Sep. 10, 1991

[54] DRAW PLATE FOR THE PRODUCTION OF MEMBRANES OF AN ORGANIC MATERIAL

[75] Inventors: Daniel Bourdiol, Pont du Casse; Franck Saux, Villeneuve-Tolosane, both of France

[73] Assignee: Societe Lyonnaise des Eaux, S.A., Paris, France

[21] Appl. No.: 456,093

[22] Filed: Dec. 22, 1989

[30] Foreign Application Priority Data

Dec. 22, 1988 [FR] France ................... 88 17372

[51] Int. Cl.⁵ .......................... B29C 47/26
[52] U.S. Cl. ..................... 425/72.1; 264/177.14; 264/209.1; 425/192 R; 425/464; 425/467; 425/DIG. 217
[58] Field of Search ............ 264/177.14, 209.1; 425/463, 467, 72.2, 72.1, 192 S, 464, DIG. 217, 536, 192 R; 65/1, 2

[56] References Cited

U.S. PATENT DOCUMENTS

| | | | |
|---|---|---|---|
| 2,965,925 | 12/1960 | Dietzsch, Sr. ................ | 264/209.1 |
| 3,075,242 | 1/1963 | Grafried ...................... | 425/467 |
| 3,081,490 | 3/1963 | Heyner et al. ................ | 425/463 |
| 3,121,254 | 2/1964 | Heyner et al. ................ | 425/DIG. 217 |
| 3,397,427 | 8/1968 | Briske, Jr. et al. ............ | 425/467 |
| 4,229,154 | 10/1980 | Chaban, Jr. et al. ........... | 264/177.14 |

FOREIGN PATENT DOCUMENTS

| | | | |
|---|---|---|---|
| 3022313 | 12/1980 | Fed. Rep. of Germany . | |
| 55-90608 | 7/1980 | Japan ................... | 264/177.14 |
| 57-35282 | 7/1982 | Japan ................... | 264/177.14 |
| 516985 | 2/1981 | Sweden . | |

Primary Examiner—Jay H. Woo
Assistant Examiner—Khanh P. Nguyen
Attorney, Agent, or Firm—Harold H. Dutton, Jr.

[57] ABSTRACT

The invention relates to an extrusion plate for the production of membranes of an organic material including at least one longitudinal passageway. This extrusion plate includes an annular body (1) provided with a cylindrical cavity into which opens at least one radial fluid conduit (5), an upper ferule (3) adapted to be inserted into the cavity of the body and comprising at least one hollow needle (8) extending in the extension of said insert and a longitudinal centering fluid feed conduit (9), and a lower insert (4) adapted to be inserted into the cavity of the body and having a bore (6) defining an extrusion chamber around the needles (8). The upper (3) and lower (4) inserts are in abutment at assembly faces at the level of which open the fluid conduits (5), and a fluid passage (7) is provided on these opposing faces in continuity with the passages (5), for communicating with the extrusion chamber.

11 Claims, 13 Drawing Sheets

DRAW PLATE FOR THE PRODUCTION OF MEMBRANES OF AN ORGANIC MATERIAL

This invention relates to a drawplate or extrusion plate for the production of membranes of an organic material, comprising at least one longitudinal passageway. It also applies in particular to extrusion plates for the production of membranes comprising a plurality of separate longitudinal passageways.

BACKGROUND AND OBJECTS OF THE INVENTION

Numerous extrusion plates are currently known for the production either of hollow fibers or membranes comprising a plurality of separate longitudinal passages. Such extrusion plates are especially described in the U.S. Pat. No(s). A-3,081,490 and A-3,075,242 (hollow fibers), German patent A-3,022,313; Swiss patent A-516,985 and U.S. Pat. No. A-2,965,925 (membranes provided with a plurality of passageways) and comprising at least one needle on the interior of which is introduced a centering fluid, and an interstitial volume around that (or those) needles in which a polymeric solution flows. While these extrusion plates present their own particular qualities, they all have some common disadvantages. They are all of a rather high cost either by reason of the complexity of their constituent elements, or by reason of a high number of such constituent elements needed for their production. Further, the time of duration of the fluids on the interior of these extrusion plates is generally long and produces heat exchange between the fluids which leads to the formation of a particular, predefined structure of the polymeric material. Finally, these extrusion plates have dead zones which makes their cleaning difficult and generally requires dismantling them for cleaning. These dead zones constitute further spaces in which air pockets may form during extrusion of the membrane.

The present invention seeks to overcome these disadvantages of known extrusion plates and has as the primary objective to provide an extrusion plate produced from a reduced number of pieces each having a simple structure.

Another object of the invention is to provide an extrusion plate able to be cleaned without disassembly.

Another object is to provide an extrusion plate in which the time of duration of fluids therein is as short as possible.

Another object is to provide an extrusion plate having no dead zones in the direction of fluid flow.

DESCRIPTION OF THE INVENTION

To this effect, the invention relates to an extrusion plate for the production of membranes of an organic material comprising at least one longitudinal passageway, characterized in that it comprises:
 an annular body having a cavity of a generally cylindrical shape and provided with at least one fluid passageway opening radially into said cavity,
 an upper insert body comprising:
  at least one upper portion of a section conjugate with that of the cavity of the body for insertion into said cavity,
  at least one hollow needle extending in the extension of said insert,
  a longitudinal centering fluid feeding passageway passing through said insert and communicating with each needle,
 a lower insert of a shape conjugate with that of the cavity of the body for insertion into said cavity, said lower insert having a bore adapted to define around the needles an extrusion chamber of a cross-section conjugate with that of the membrane to be produced,
 the lower and upper insert bodies being in face to face abutting relationship one against the other,
 each fluid passageway being arranged in the annular body in such a manner as to empty at the level of the opposing faces of the upper and lower inserts,
 a fluid passage being arranged on said opposing faces in continuity with each of the fluid passageways for communicating with the extrusion chamber.

The time of duration of the polymeric solution on the interior of this extrusion plate is thus extremely short because it is introduced practically directly into the extrusion chamber around the needles through the intermediary the fluid passages. The heat exchange between polymeric solution and centering fluid being thereby reduced to a minimum, this extrusion plate permits fabricating membranes of which the structure of the polymeric material is well defined.

Further, this extrusion plate is composed of three primary pieces, to a maximum of four as will be seen below, of a simple structure, from identical raw starting blanks, permitting notably the production of membranes having different arrangements and numbers of passageways.

According to a preferred embodiment, the fluid passageways of the annular body and the fluid passageway provided on the opposing faces of the lower and upper inserts are adapted to define a section of fluid passageway decreasing in the direction of flow of said fluid.

The cross-section of the polymeric material passageway is therefor constantly decreasing in the direction of flow of this material, which goes in the direction of an increasing loss of load. For this reason, this extrusion plate has no dead space susceptible of causing the creation of air pockets. Further, it has no inaccessible zone preventing proper cleaning without disassembly.

For these reasons, the lower portion of the upper insert may advantageously have an external cross-section adapted to be for fitted into the cavity of the annular body. Thus, this upper insert is not removable, which avoids any risk of bending or breaking of the needles during any eventual disassembly operation.

Further, the lower insert itself advantageously has an external cross-section adapted to be forcefully inserted into the cavity of the annular body. The two inserts are thus precisely centered one with respect to the other and this mounting requires neither sealing gaskets nor supplementary securing elements.

According to another characteristic of the invention, each fluid passage arranged on the opposing faces of the lower and upper inserts is comprised of a groove provided in the face of one of said inserts in continuity with a fluid passage of the annular body.

Two preferred embodiments are provided for the production of the needles. Thus, these needles may, in the first case, be formed out of the mass of the upper insert. The extrusion plate may also comprise:
 an upper insert comprising at least one longitudinal bore traversing and opening into the longitudinal passageway for feeding the centering fluid, a needle lodged in each bore in such a manner as to form a lower portion extending partially into the extension of the upper insert and an opposite upper extremity, opening into the centering fluid feed passage, said upper extremity being secured by brazing or bonding in said feed passage.

Finally, this extrusion plate may be utilized for the production of a hollow fiber and comprise a single needle. It may also permit the production of membranes provided with several separate longitudinal passageways and comprise:

either several needles aligned in the prolongation of the upper insert and a lower insert provided with a bore having a rectangular cross-section defining around said needles an extrusion chamber of a rectangular cross-section of lesser width with respect to its length, or several needles arranged concentrically with respect to the longitudinal axis of said extrusion plate, and a lower insert provided with a bore of a circular cross-section defining around said needles an extrusion chamber with a cylindrical cross-section.

DESCRIPTION OF THE DRAWINGS

Other characteristics, objects and advantages of the invention will become apparent from the detailed description which follows in reference to the accompanying drawings which show by way of non-limiting examples three preferred embodiments of the invention. In these drawings which form an integral part of the present description.

DESCRIPTION OF PREFERRED EMBODIMENTS

The extrusion plates shown in the drawings are intended for the production of membranes provided with a plurality of separate longitudinal passageways. They comprise principally three elements: an annular body 1 having a cavity 2 of a generally cylindrical shape and upper and lower inserts 3, 4 inserted into the cavity 2 of the annular body 1 and being in face to face abutment against each other at the opposing faces 3a, 4a.

In the description which follows, the same reference characters are used to designate the equivalent elements of the three types of extrusion plates described.

In the first place, the extrusion plate shown in FIGS. 1 to 7 is intended for the production of cylindrical membranes provided with seven separate longitudinal passageways.

Figure 1:
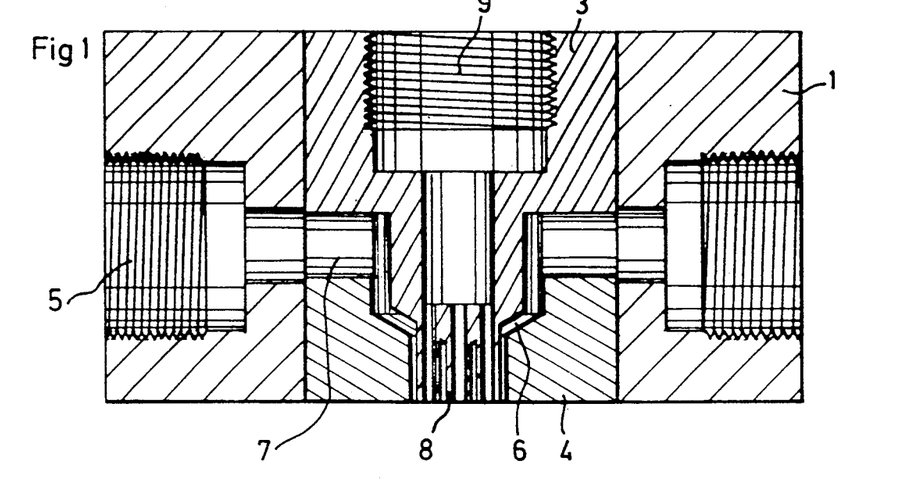
FIG. 1 is a longitudinal cross-section along a plane A of an extrusion plate according to the invention for the production of a cylindrical membrane comprising seven separate passageways.
Figure 2:
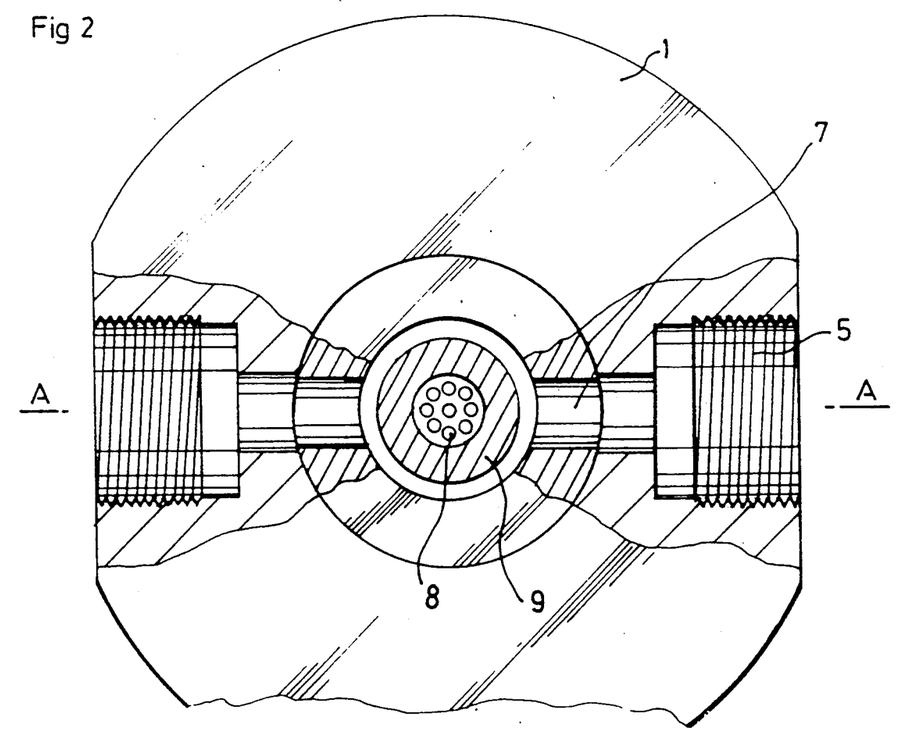
FIG. 2 is a top view of this extrusion plate with two portions broken away.
Figure 7:
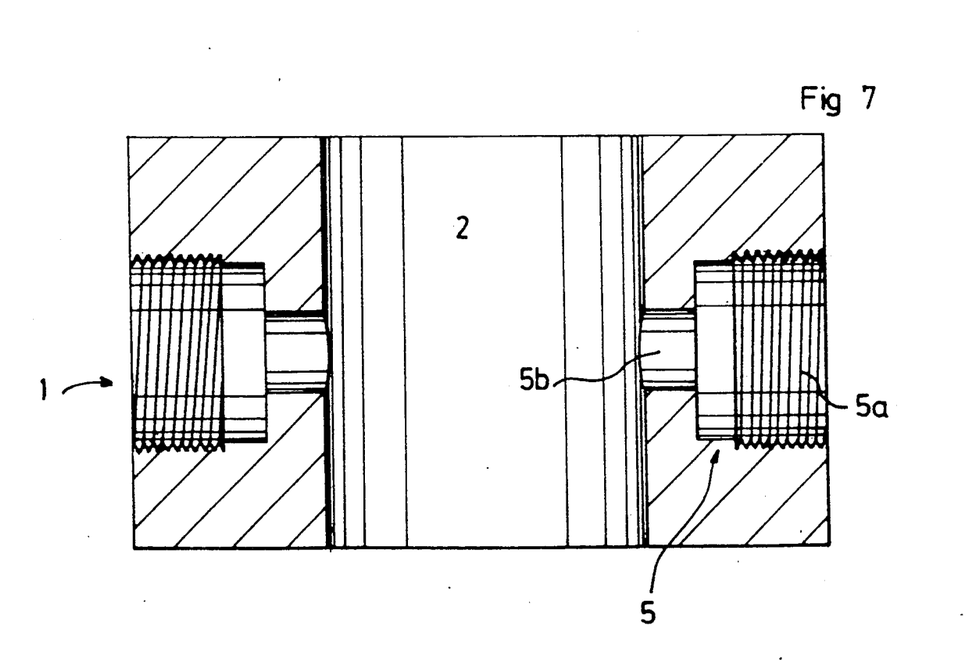
FIG. 7 is a longitudinal cross-section of the annular body of this extrusion plate.

The annular body 1 of this extrusion plate has a generally cylindrical external shape and comprises a longitudinal central cavity 2, itself of a cylindrical shape.

Further, two diametrically opposed fluid conduits are 5 are arranged radially in the wall of this annular body 1, in such a manner as to open into the cavity 2. These conduits 5 comprise a first, threaded portion 5a opening out of the peripheral wall of the body 1 and adapted to permit the attachment of fluid inlet conduits having a conjugate threaded connections, and a second portion 5b of lesser cross-section opening into the cavity 2.

Figure 3:
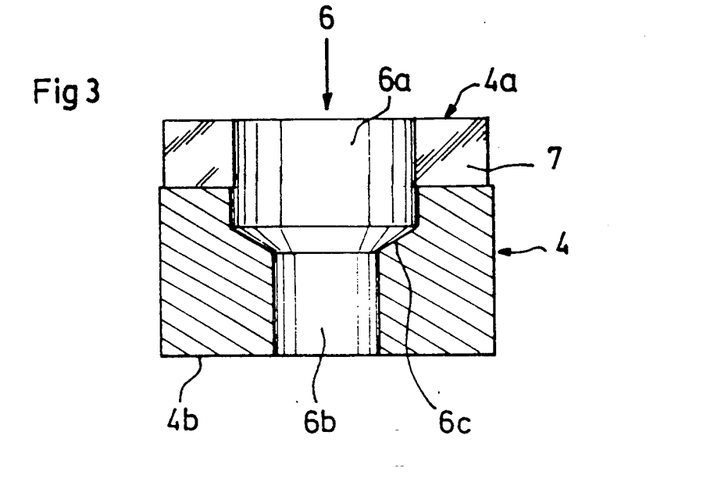
FIG. 3 is a longitudinal cross-section through plane B of the lower insert of this extrusion plate.
Figure 4:
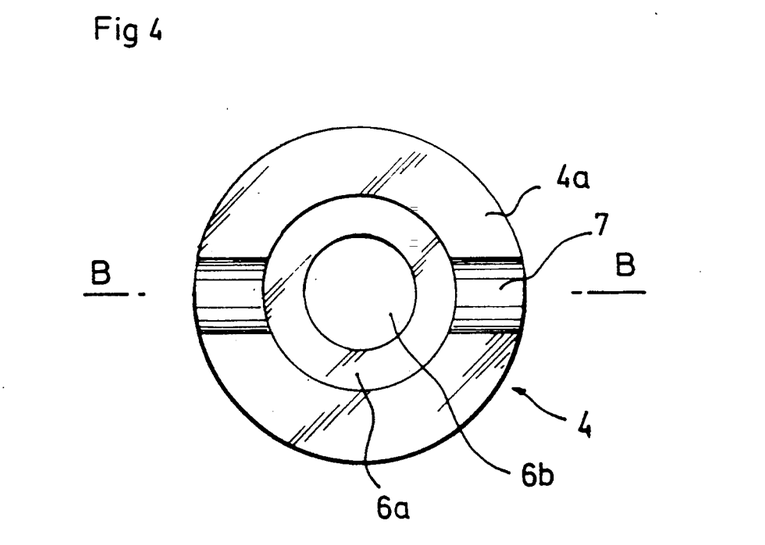
FIG. 4 is a top view of this lower insert.

The lower insert 4 also has a cylindrical external shape conjugate with that of the cavity 2 of the annular body 1 to be able to be inserted therein by force fit.

This lower insert 4 comprises a longitudinal bore 6 provided with a chamfered shoulder 6c dividing it into two bores of different diameters: an upper bore 6a of a greater diameter emptying at the level of the assembly face 4a of the insert 4, and a lower bore 5b of a diameter conjugate with that of the membrane to be produced, emptying at the level of the lower face of this insert 4.

Finally, the assembly face 4a of the insert 4 comprises two radial aligned grooves 7 emptying respectively into the upper portion 6a of the bore 6 and at the level of the peripheral wall of this insert. These grooves 7 are arranged to come into alignment with the portions 5b of the fluid conduits 5 of the annular body 1 when the lower insert 4 is inserted into the cavity 2 of this body 1.

Figure 5:
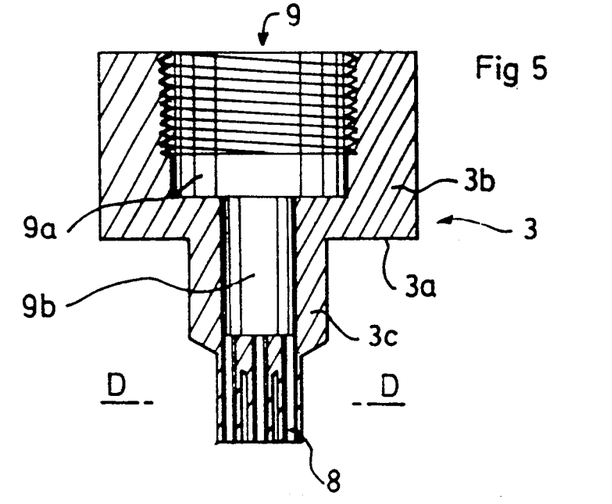
FIG. 5 is a longitudinal cross-section through plane C of the upper insert of this extrusion plate.
Figure 6:
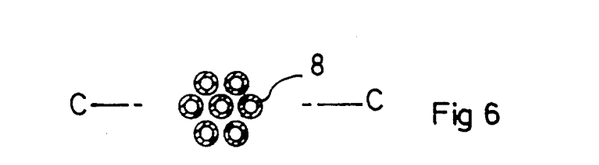
FIG. 6 is a transverse cross-section through plane D of this upper insert.

The upper insert 3 comprises itself an upper portion 3b of a cylindrical external shape adapted to be force fit into the cavity 2 of the annular body 1. This upper portion 3b has a lower assembly face 3a which comes into abutment on the assembly face 4a of the lower insert 4.

In the extension of this upper portion 3b extends a lower portion 3c of a shape conjugate with that of the bore 6 of the lower insert 4, adapted to define with the internal wall of this bore 6 an annular fluid passage communicating with the annular fluid passage.

finally, the upper insert comprises a longitudinal passageway 9 for feeding the needles 8 with a centering fluid. This passageway 9 comprises two portions of different diameters separated by a shoulder: an upper threaded portion 9a emptying at the level of the upper face of the upper insert 3 and adapted to permit the connection of a centering fluid inlet passageway provided with a conjugate threaded ferrule, and a lower portion 9b of a lesser diameter communicating with the needles 8.

The extrusion plate shown in FIGS. 8 to 18 is intended for the production of planar membranes provided with seven separate and aligned longitudinal passageways.

Figure 17:
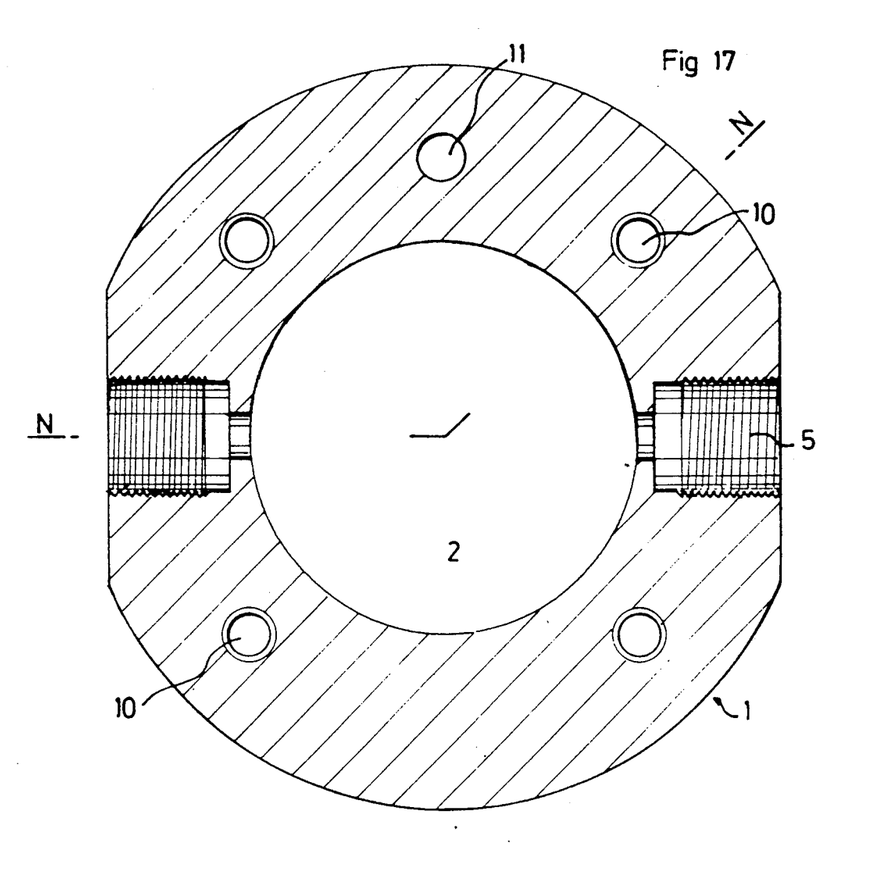
FIG. 17 is a transverse cross-section through plane M of the annular body of this extrusion plate.
Figure 18:
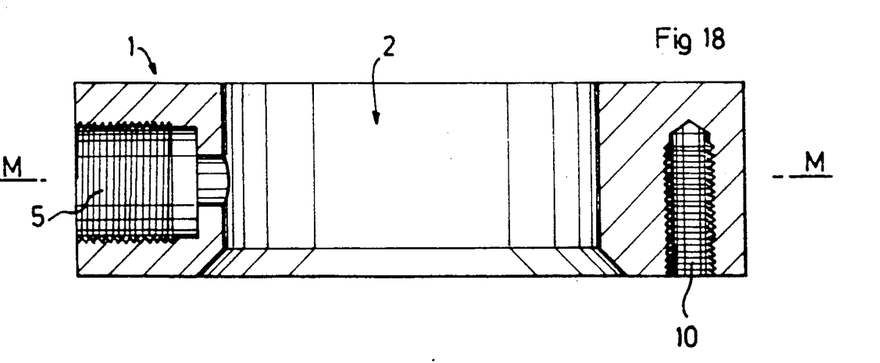
FIG. 18 is a longitudinal cross-section through broken plane N of this annular body.

The body 1 of this extrusion plate is also of a generally cylindrical shape and comprises two radial fluid conduits 5 emptying into a cavity 2. This cylindrical cavity 2 has a lower, chamfered extremity portion.

The wall of this body 1 is provided with four threaded longitudinal blind openings 10 and a through opening 11.

Figure 10:
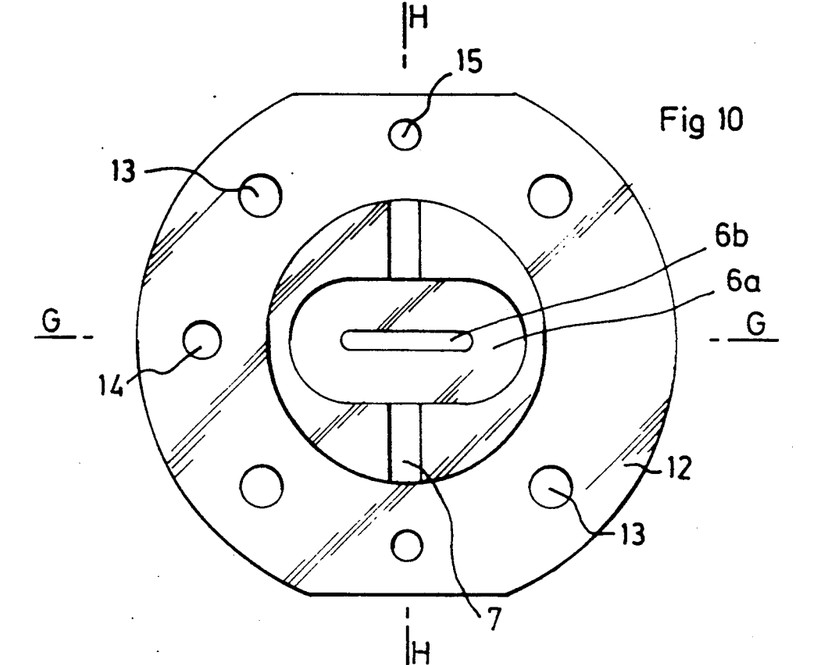
FIG. 10 is a top view of the lower insert of this extrusion plate.
Figure 11:
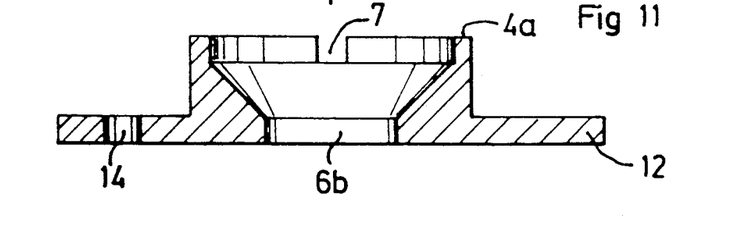
FIG. 11 is a longitudinal cross-section through plane G of this lower insert.
Figure 12:
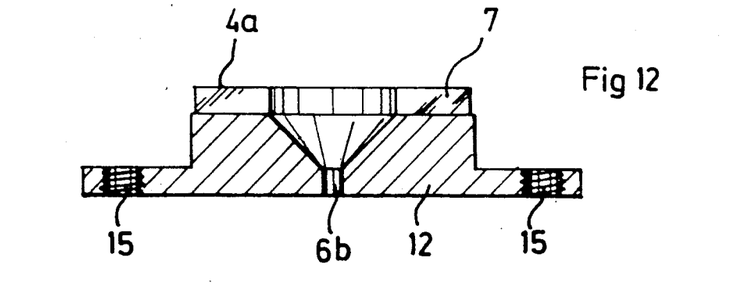
FIG. 12 is a longitudinal cross-section through plane H.

The lower insert 4 comprises also a generally cylindrical external shape conjugate with that of the cavity 2 of the body 1 for being inserted by force into the latter. This lower insert comprises also a frontal wall 12 presented in the form of a plate adapted to come into placement against the lower face of the body 1.

This frontal wall 12 is provided with four openings 13 conjugate with the threaded openings 10 of the body 1 to permit assembly of these two pieces by means of securing screws, and one opening 14 opposite the transverse opening 11 of this body. Also, it comprises two threaded openings 15 intended to permit withdrawal by means of a tool provided having a conjugate thread.

Figure 8:
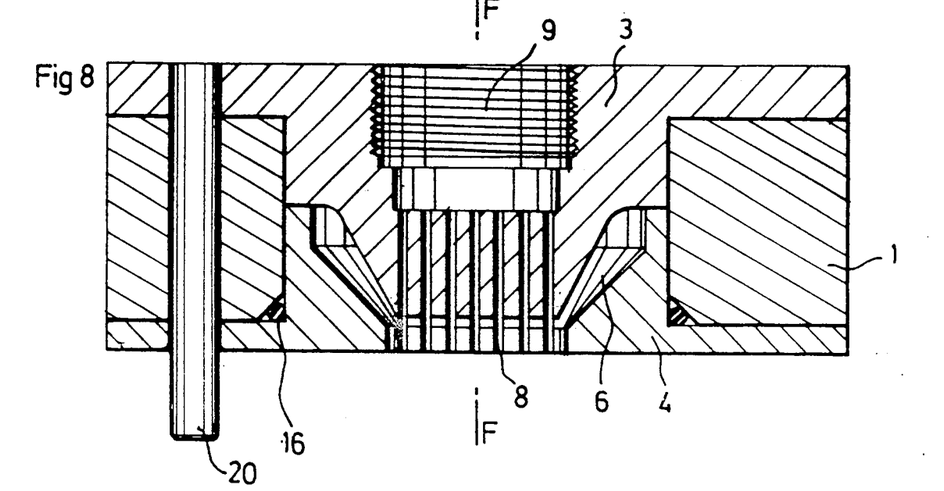
FIG. 8 is a longitudinal cross-section through plane E of an extrusion plate according to the invention for the production of a planar membrane comprising seven separate passageways.
Figure 9:
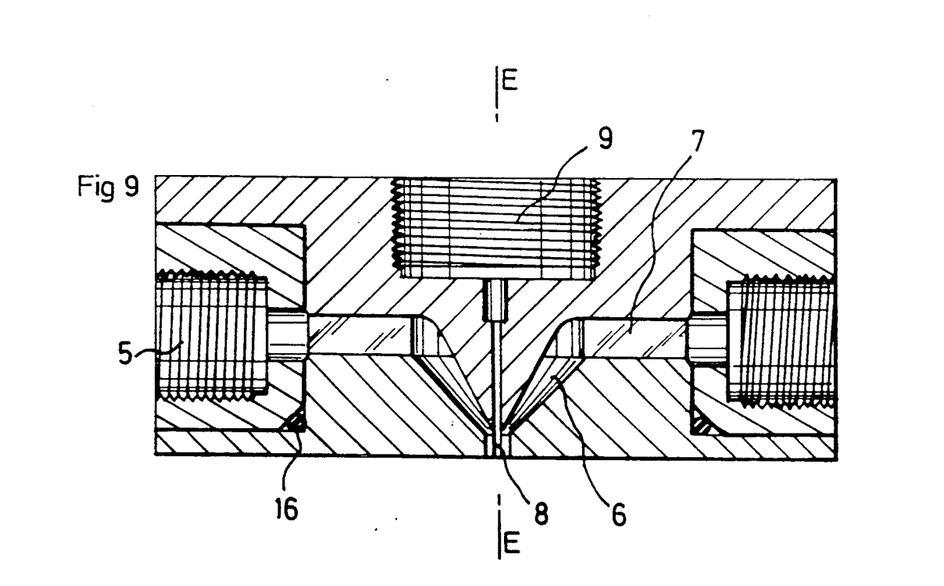
FIG. 9 is a longitudinal cross-section through plane F of this extrusion plate.

As is shown in FIGS. 8 and 9, an annular seal 16 housed in the chamfered extremity of the bore 2 of the body 1 assures the seal between this body 1 and the lower insert 4.

Figures 14, 15, 16:
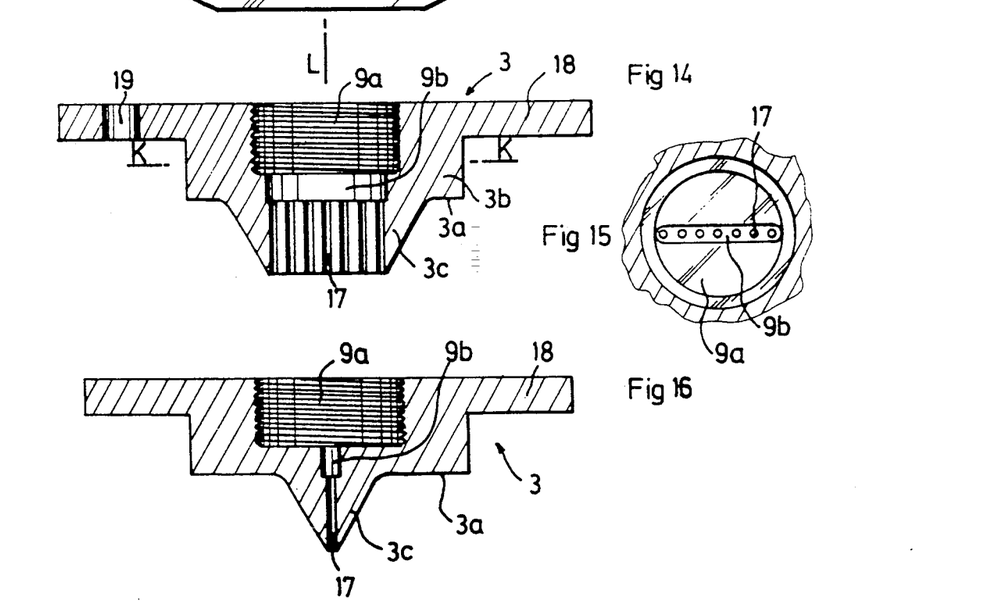
FIG. 14 is a longitudinal cross-section through plane J of this upper insert.
FIG. 15 is a transverse cross-section through plane K.
FIG. 16 is a longitudinal cross-section through plane L.

In the extension of this upper portion 3b extends a lower portion 3c of a shape conjugate with that of the bore 6 of the lower insert 4, adapted to define with the internal wall of this bore 6 an annular fluid passage communicating with the grooves 7.

Figure 13:
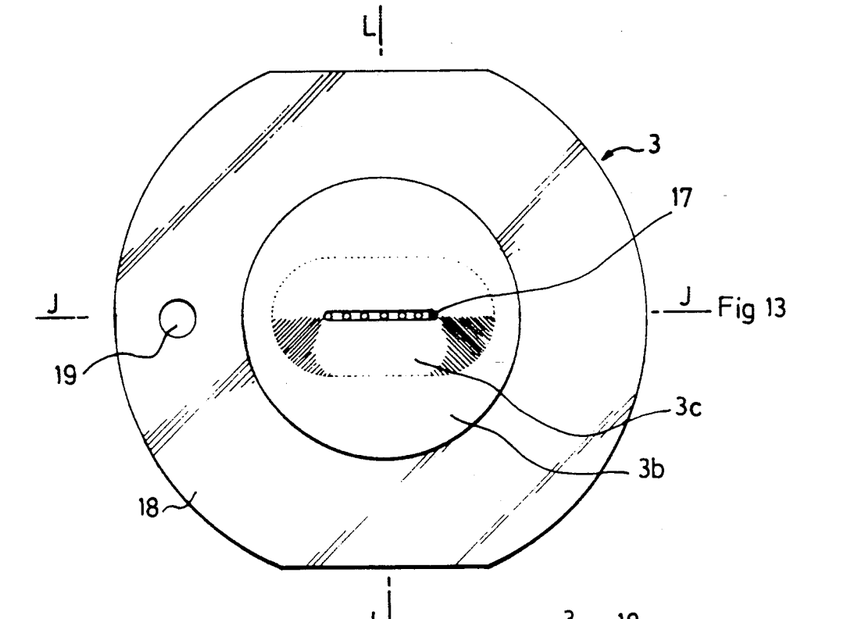
FIG. 13 is a bottom view of the upper insert of this extrusion plate.

The lower extremity of this portion 3c is also pierced with longitudinal bores 17, seven in number, each of which houses a needle 8 arranged to extend partially into the extension of the upper insert 3 in such a manner as to define an interstitial volume communicating with the annular fluid passage, at the level of the rectangular cross-section bore 6b of the lower insert 4. Each of these needles 8 is secured by brazing or soldering.

The upper insert 3 comprises a longitudinal passageway 9 for feeding the needles 8 with a centering fluid. This passageway 9 comprises two portions of different diameters separated by a shoulder: an upper threaded portion 9a opening at the level of the upper face of the upper insert 3 and adapted to permit the connection of an inlet passageway for the centering fluid provided with a conjugate threaded connection, and a lower portion 9b of a rectangular cross-section communicating with the needles 8.

Finally, this upper insert 3 comprises a frontal face 18 adapted to come into contact on the upper face of the body 1. This front face 18 has an opening 19 adapted to position it with respect to the respective openings 11 and 14 of the annular body 1 and of the lower insert 4 in such a manner as to permit indexing the position of these three pieces by means of a centering pin 20.

The extrusion plate shown in FIGS. 19 to 29 is intended for the production of cylindrical membranes provided with nineteen separate longitudinal passageways.

Figure 28:
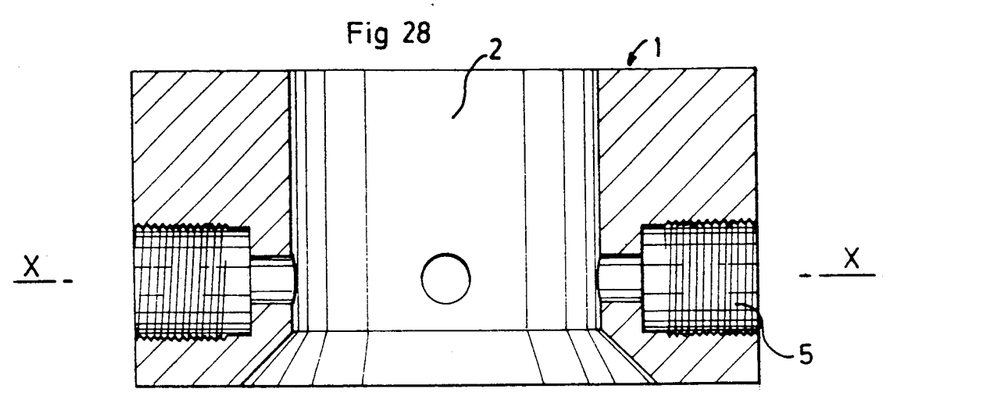
FIG. 28 is a longitudinal cross-section through plane U of the annular body of this extrusion plate.
Figure 29:
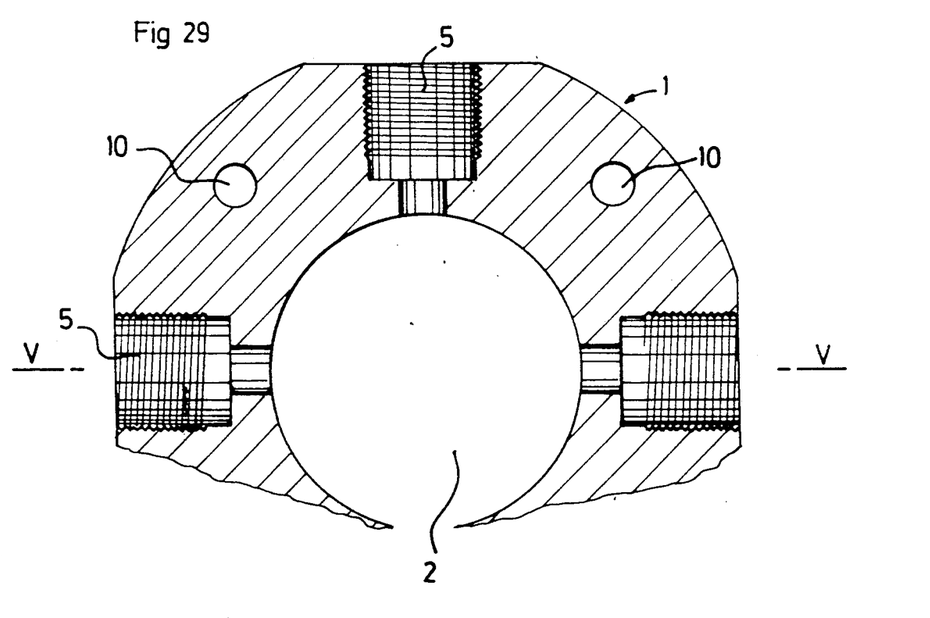
FIG. 29 is a partial transverse cross-section through plane X of this annular body.

The body 1 of this extrusion plate is of a cylindrical external shape and comprises four radial fluid conduits 5 opening into a cavity 2. This cylindrical cavity 2 has a chamfered lower extremity portion.

The wall of this body is provided with four longitudinal threaded openings 10.

Figure 22:
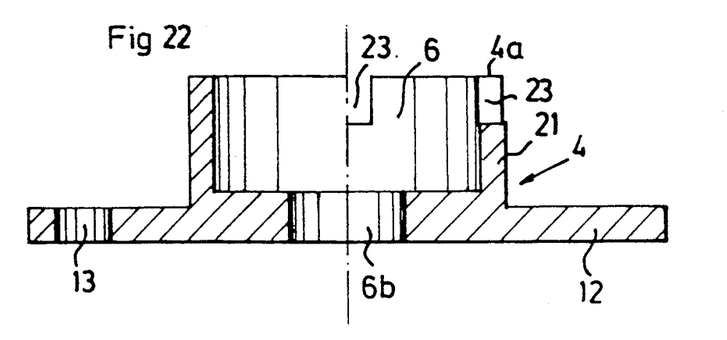
FIG. 22 is a longitudinal cross-section along broken plane S of the lower insert of this extrusion plate.
Figure 23:
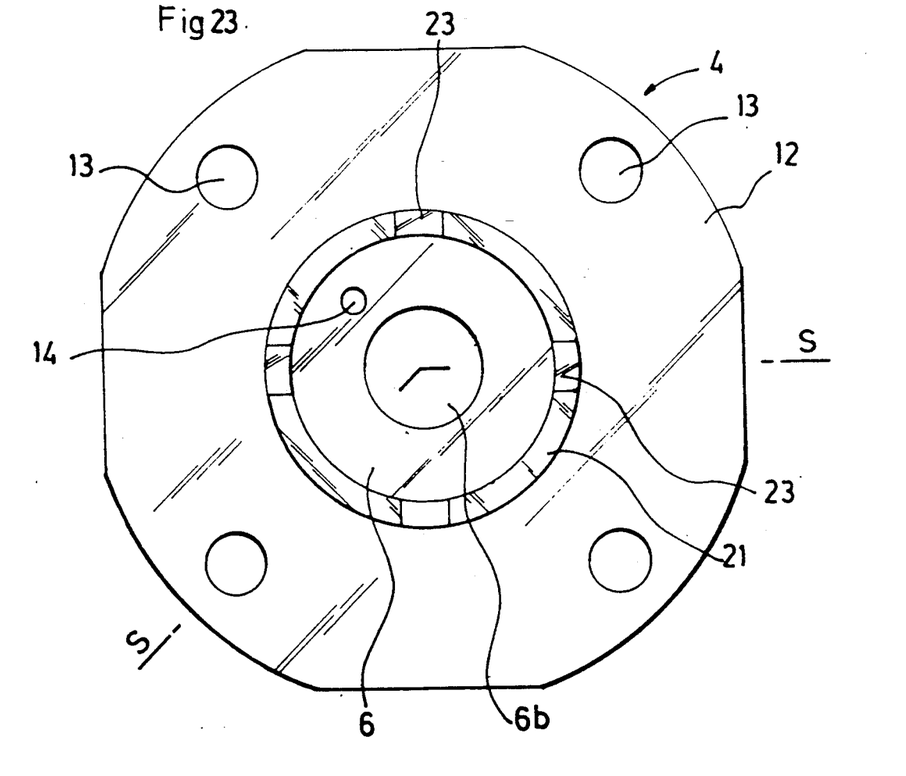
FIG. 23 is a top view of this lower insert.

The lower insert 4 has the shape of a sleeve comprising a peripheral cylindrical wall 21 conjugate with the cavity 2 of the body 1 to be inserted by force into this latter. This lower insert comprises a front wall 12 having the shape of a plate adapted to be placed against the lower face of the body 1.

This front wall 12 is provided with four openings 13 conjugate with the threaded openings 10 of the body for the assembly of these tow pieces by means of securing screws 22, and an opening 14.

Figure 20:
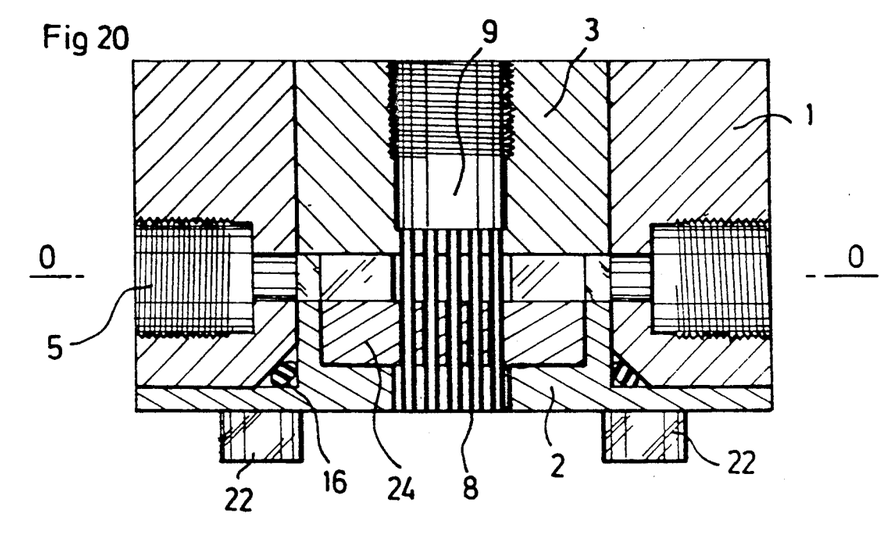
FIG. 20 is a longitudinal cross-section through plane P of this draw plate.
Figure 21:
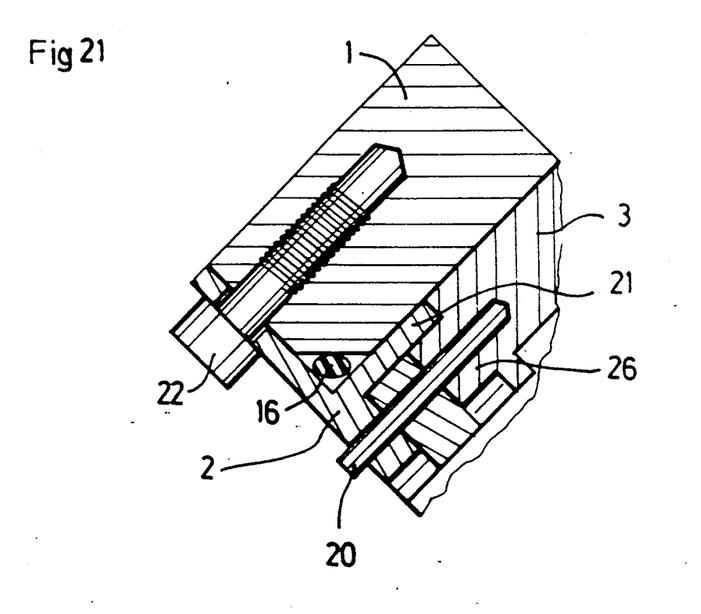
FIG. 21 is a partial longitudinal cross-section through plane R.

As is shown in FIGS. 20 and 21, an O-ring seal 16 housed in the chamfered extremity of the bore 2 of the body 1 assures the seal between this body 1 and the lower insert 4.

This lower insert 4 comprises a longitudinal bore 6 defined by the annular peripheral wall 21 and opening at the level of the front face 12 of the insert through a cylindrical bore 6b of a diameter corresponding with that of the membrane to be produced.

The upper edge of the peripheral wall 21 serves as the assembly face 4a and comprises four notches 23 determining fluid passages communicating with the fluid conduits 5 of the annular body 1.

Figure 26:
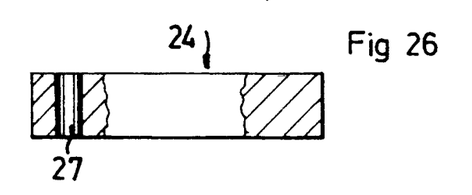
FIG. 26 is a partial longitudinal cross-section of the intermediate plate of this extrusion plate.
Figure 27:
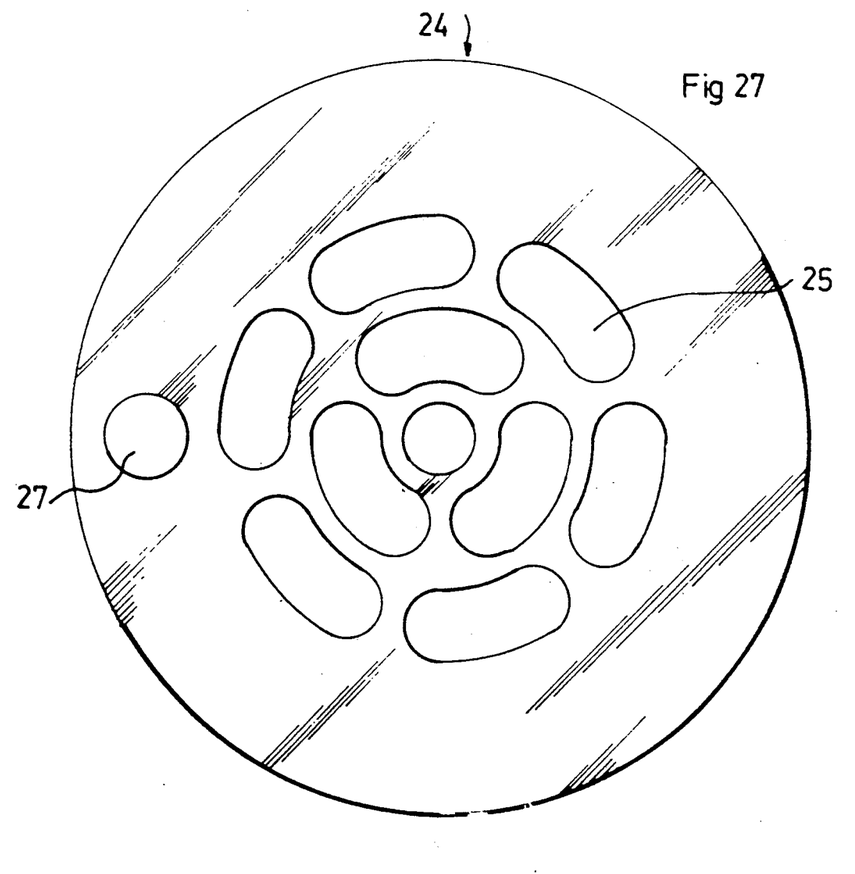
FIG. 27 is a top view on an enlarged scale of this intermediate plate.

On the interior of the bore 6 is provided an intermediate plate 24 of a diameter conjugate with this bore 6 and comprising opposite lower bore 6b a plurality of fluid passages 25 arranged concentrically and having an elongated, rounded shape. Each of these fluid passages 25 is intended to house two needles 8 and to determine therearound an interstitial volume.

Figure 24:
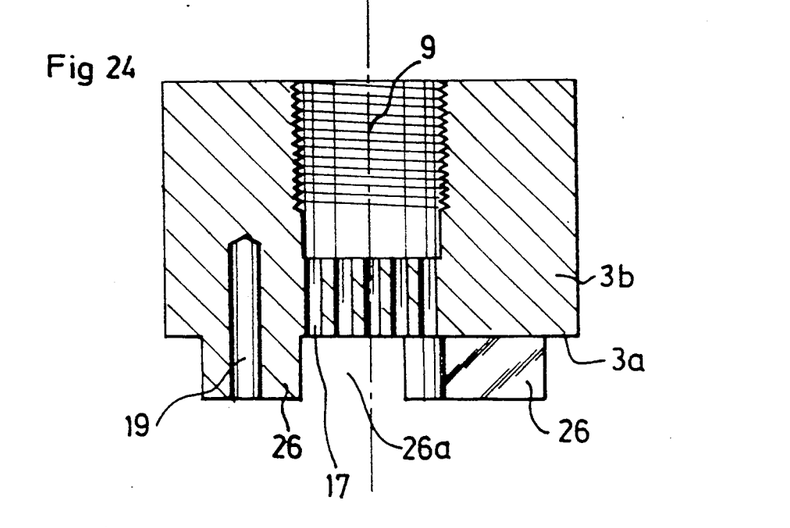
FIG. 24 is a longitudinal cross-section through broken plane T of the upper insert of this extrusion plate.
Figure 25:
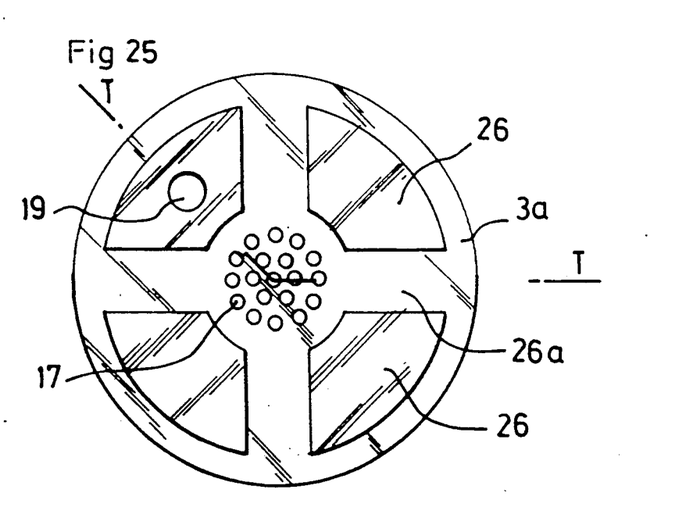
FIG. 25 is a bottom view of this upper insert.

The upper insert 3 comprises an upper portion 3b of a cylindrical shape adapted to be inserted forcibly into the cavity 2 of the annular body 1. This upper portion 3 comprises an assembly face 3a in abutment with the upper ends of the peripheral wall 21 of the lower insert.

This upper insert 3 comprises four plugs 26 having the shape of sectors of a circle and are arranged in such a manner as to define between them fluid passages 26a in communication with the notches 23 of the peripheral wall 21 in such a manner as to lead this fluid toward a central zone of the conjugate circular section of this bore 6b of the lower insert 4.

The upper insert 3 is pierced with longitudinal bores 17, nineteen in number, arranged in such a manner as to open at the level of the assembly face 3a, in the aforementioned central zone. Each of these bores 17 is adapted to house a needle 8 arranged to be partially extended in the extension of the upper insert 3, in such a manner as to traverse a fluid passage 25 of the intermediate plate 24 and be extended into the bore 6b of the lower insert 4. The securing of these needles 8 is obtained by brazing or soldering.

The assembly of needles 8 thus determines in this bore 6b an interstitial volume communicating with the fluid conduits 5 of the annular body 1 through the intermediary of the fluid passages 25 of the intermediate plate 24.

The upper insert 3 comprises a longitudinal passageway 9 for feeding a centering fluid. This passageway 9 is threaded for connection of the inlet conduits for the centering fluid and communicates with the needles 8.

Finally, this upper insert 3 comprises a blind opening 19 arranged to be positioned opposite the opening 14 of the lower insert 4 in such a manner as to permit indexing the position of these pieces by means of an indexing pin 20 housed in said openings 14, 19 and traversing a third opening 27 provided in the intermediate plate 24.

The operation of these three extrusion plates is identical. The centering fluid is fed into the feed conduit 9 of the upper insert 3 by means of a conduit connected to this insert, and then flows to the interior of the needles.

The polymeric solution is introduced into the fluid conduits 5 by means of conduits connected to the annular body 1 and flows in the fluid passages arranged between the assembly faces 3a, 4a of the lower insert 4 and the upper insert 3 until in the bore 6b where is it distributed among the needles 8.

Figure 19:
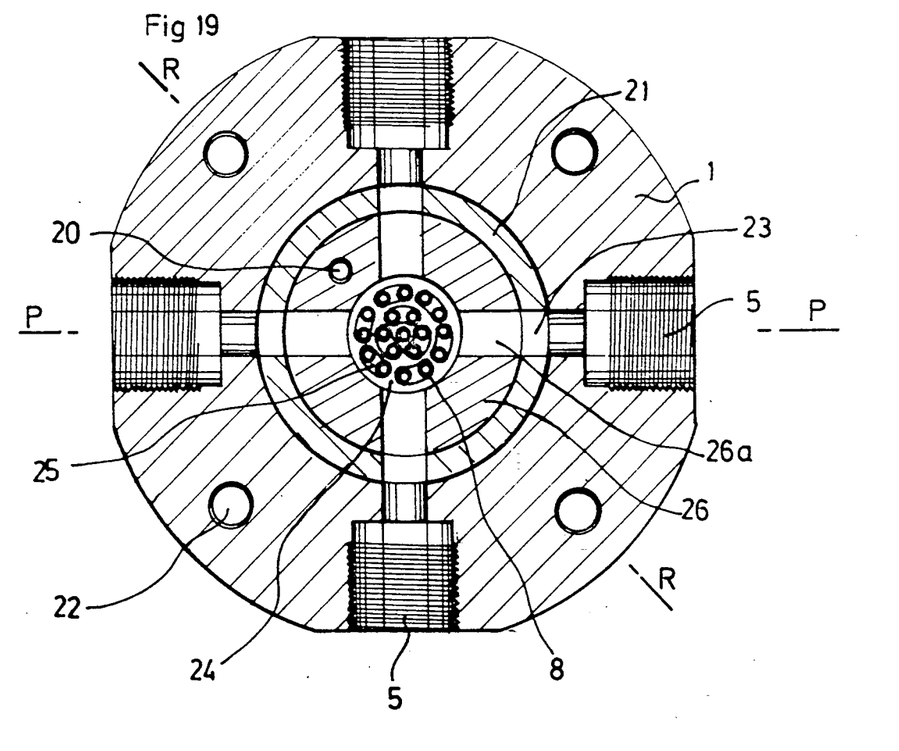
FIG. 19 is a transverse cross-section along plane O of an extrusion plate according to the invention for the production of a cylindrical membrane comprising 19 separate passageways.

It should be noted, however, that the extrusion plate for the production of membranes comprising nineteen passageways comprises an intermediate plate 24 dividing the bore 6 of the lower insert into two compartments: an upstream compartment into which open the fluid passages, and a downstream compartment corresponding to the bore 6b and constituting the outlet chamber of the extrudate.

The role of this plate 24, used for extrusion plates comprising a sizeable number of needles 8, is to create an adjustable loss of load according the thickness of the plate, permitting assuring a homogeneous distribution of the polymeric solution among the needles 8.

We claim:

1. An extrusion plate for the production of membranes of an organic material having at least one longitudinal passageway, and comprising:
    an annular body (1) having a cavity (2) of a generally cylindrical shape and provided with at least one fluid passageway (5) opening radially in said cavity,
    an upper insert body (3) comprising:
        at least one upper portion (3b) of an external cross-section conjugate with that of the cavity (2) of the body (1) so as to be insertable by force fit into said cavity,
        at least one hollow needle (8) extending into an extension of said insert,
        means defining a longitudinal passageway (9) traversing said insert (3) for feeding a centering fluid and communicating with said at least one needle (8),
    a lower insert body (4) having an external shape conjugate with that of said cavity (2) and insertable by force fit into said cavity, said lower insert having a bore (6) adapted to define about the needles (8) an extrusion chamber (6b) of a cross-section conjugate with that of the membrane to be produced,
    the lower insert (4) and the upper insert (3) having opposing faces (4a, 3a) in abutting contact,
    each fluid conduit (5) being arranged in the annular body (1) in such a manner as to open at the level of the opposing faces (3a, 4a) of the lower insert (4) and upper insert (3),
    means defining a fluid passage (7; 23, 26a) arranged on said opposing faces, in continuity with each of the fluid conduits (5) for establishing fluid communication with the extrusion chamber (6b).

2. An extrusion plate as in claim 1 comprising pin means for indexing the relative position of the cavity (2) of the annular body (1).

3. An extrusion plate as in claim 1, and wherein said fluid conduits (5) of the annular body (1) and the fluid passage (7; 23,26a) arranged on the opposing faces (3a, 4a) of the lower (4) and upper (3) inserts define a section of a fluid passageway of cross-sectional area decreasing in the direction of fluid flow.

4. An extrusion plate as in claim 1:
    and wherein said upper insert (3) comprises at least one longitudinal bore (17) traversing and opening into a longitudinal centering fluid feed passageway (9),
    a needle (8) housed in each bore (17) in such a manner as to comprise a lower portion extending partially into an extension of the upper insert (3) and an upper opposite extremity opening into said centering fluid feed passageway (9), said upper extremity being secured in said feed passage.

5. An extrusion plate as in claim 1, and wherein each needle (8) is integral with said upper insert (3).

6. An extrusion plate as in claim 1, and wherein each of said passageways comprises threaded extremities for the connection of fluid inlet conduits having a corresponding threaded connection.

7. An extrusion plate as in claim 1 and wherein each passageway provided on the opposing faces of the lower (4) and upper (3) inserts comprises a groove (7) provided in the face of one of said inserts in communication with a fluid passageway (5) of the annular body (1).

8. An extrusion plate as in claim 1, and comprising a plurality of said needles (8) aligned in the extension of said upper insert (3), and said lower insert (4) being provided with a bore (6b) of a rectangular cross-section defining around said needles an extrusion chamber of a rectangular cross-section of a width greater than its length.

9. An extrusion plate as in claim 1, comprising a plurality of said needles being arranged concentrically with respect to the longitudinal axis of said extrusion plate, and a lower insert (4) provided with a bore (6b) of a circular cross-section defining around said needles an extrusion chamber of a cylindrical cross-section.

10. An extrusion plate as in claim 9, and including an intermediate plate (24) arranged in the bore (6) of the lower insert (4) in such a manner as to divide the latter into two compartments: an upstream compartment into which each fluid conduit (5) opens, and a downstream compartment (6b) constituting the extrudate outlet chamber, said intermediate plate being provided with a plurality of passages (25) arranged in such a manner as to permit the passage of fluid toward the interstitial volume of the downstream compartment around the needles (9).

11. An extrusion plate as in claim 10, and wherein said fluid passages (25) of the intermediate plate 24 have a rounded, elongated shape and each house two needles.

* * * * *